Nov. 28, 1950 — M. T. CAHENZLI, JR — 2,532,146
STRAINER FOR COFFEE MAKERS AND METHOD OF MAKING SAME
Filed April 12, 1946
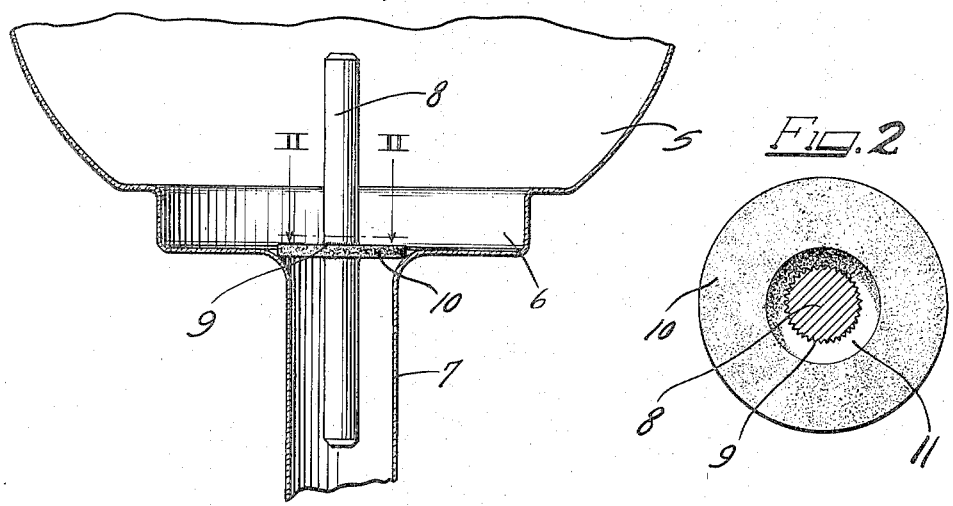
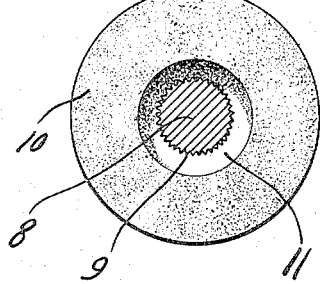
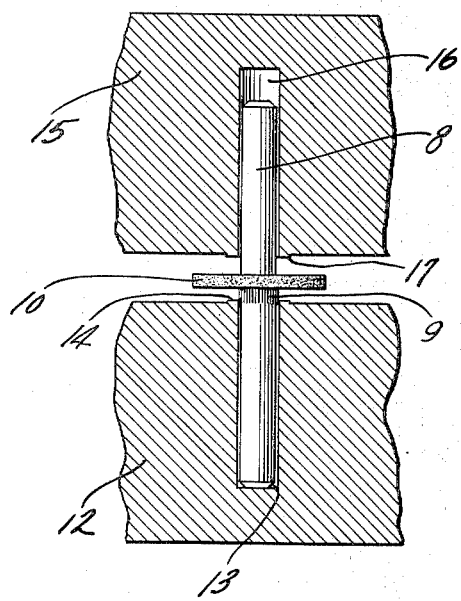
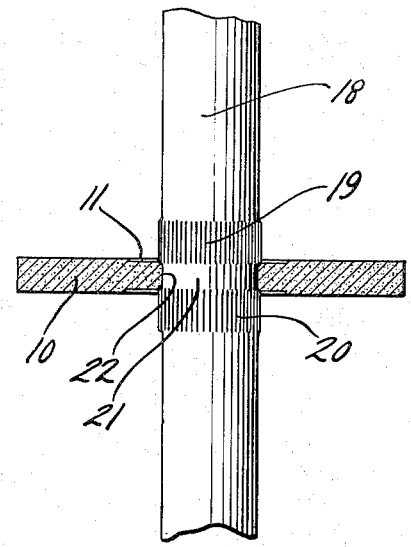
Inventor
MARTIN T. CAHENZLI JR.

Patented Nov. 28, 1950

2,532,146

UNITED STATES PATENT OFFICE 2,532,146

STRAINER FOR COFFEE MAKERS AND METHOD OF MAKING SAME

Martin T. Cahenzli, Jr., Chicago, Ill., assignor to The Harry Alter Company, Chicago, Ill., a corporation of Illinois Application April 12, 1946, Serial No. 661,758

3 Claims. (Cl. 210—162)

This invention relates to improvements in a strainer for coffee makers and to a method of making the strainer, the invention being highly desirable for use in connection with so-called vacuum type coffee makers which embody associated upper and lower bowls, although the invention may have other uses and purposes as will be apparent to one skilled in the art.

In the past, many and various types of straining or filtering media have been developed for coffee makers especially that type of coffee maker utilizing associated upper and lower bowls in which the upper bowl contains the ground coffee and the hot water is elevated by steam pressure from the lower bowl through a tube in the upper bowl, and then due to the sub-atmospheric pressure in the lower bowl drains back through the coffee grounds into the lower bowl. Formerly known strainers used for this purpose were objectionable in many ways. One of these strainers comprised a glass rod having an intermediate bulbous portion externally roughened which rested in the mouth of the tube depending from the upper bowl of the coffee maker. The roughened exterior permitted liquid to pass by but prevented the passage of grounds. Such a strainer was very fragile, and if accidentally dropped was at once broken. Further, such a strainer rose out of position if the water in the lower bowl was boiled at a high rate, thus permitting coffee grounds to settle between the strainer and the mouth of the tube, in which event the strainer had to be removed before the liquid in the upper bowl would descend to the lower bowl. In another instance, strainers were used that required a covering of cloth, and the body of the strainer was porcelain or equivalent material. From such a strainer, a string or wire extended through the tube of the coffee maker and hooked over the bottom of the tube to prevent the strainer from rising out of position. An implement of this character, however, required tedious labor in placing the cloth on the strainer, and the cloth had to be replaced with a new one at very frequent intervals. In still other cases, cloth covered wire frames were utilized, and those wire frames had to be recovered at frequent periodic intervals thus requiring a steady upkeep expense as well as an objectionable amount of labor to utilize the coffee maker. All of these formerly known strainers were objectionably difficult to clean and maintain in proper condition and had to be accurately placed or seated in the upper bowl of the coffee maker.

With the foregoing in mind, it is an important object of the instant invention to provide a strainer for a coffee maker that need merely be placed or dropped in position with no particular care whatever on the part of the operator.

A further object of the invention is the provision of a simply constructed strainer for a coffee maker which when once placed in position will retain its position and not rise out of place due to excessive boiling of the liquid in the lower bowl of the coffee maker.

A further object of the invention resides in the provision of a strainer for a coffee maker which has no covering, needs no adjustments, and which is ready for instant use at any time with no operations upon the strainer required.

Also a feature of this invention resides in the provision of a strainer for a coffee maker that is extremely durable and which has no parts to replace at periodic intervals, the single strainer never requiring any replacements and having a life equally as long as the coffee maker itself, not considering breakage of the coffee maker.

It is a further feature of this invention to provide a strainer for a coffee maker which is readily cleansed and may easily be cleansed in a normal dish washing operation along with other parts of the coffee maker, dishes, and cutlery.

Another object of the invention resides in the provision of a strainer for a coffee maker which may be effectively utilized with either end uppermost.

A further object of the invention is the provision of a strainer for a coffee maker that may be constructed entirely of metal and is therefore non-fragile or non-frangible.

Still a further object of the invention resides in the provision of a strainer for a coffee maker that will fit substantially any vacuum type coffee maker and which is far more economical than strainers now in use.

It is another object of the invention to provide a new and novel method of making a strainer for a vacuum type coffee maker.

While some of the more salient features, characteristics and advantages of the instant invention have been above pointed out, others will become apparent from the following disclosures, taken in conjunction with the accompanying drawing, in which Figure 1 is a fragmentary vertical sectional view through the upper bowl of a vacuum type coffee maker, illustrating a strainer embodying principles of the instant invention in elevation and in operative position;

Figure 2 is an enlarged plan sectional view through the strainer taken substantially as indicated at the line II—II of Figure 1, looking in the direction of the arrows;

Figure 3 is a vertical sectional view through dies, with parts of the strainer shown in elevation, and illustrating a step in the process of making the strainer; and Figure 4 is a fragmentary, part sectional, part elevational view of a strainer embodying principles of this invention but illustrating a slightly different form of construction of the strainer.

As shown on the drawing:

That illustrated embodiment of the instant invention seen in Figures 1 and 2 is shown in association with the upper bowl of a coffee maker of the commonly called vacuum type. This bowl, generally indicated by numeral 5, includes a substantially spherical body portion, and embodies a substantially flat bottomed well 6, the bottom of which merges smoothly into a depending tube 7. The bowl may be made of glass, ceramic material or metal depending upon which may be most desired. It should be clearly understood that the bowl 5 is selected merely for illustrative purposes only, and the instant invention may equally as well be associated with bowls having different shapes or contours with no alteration in the strainer itself.

In Figure 1, a strainer embodying principles of the instant invention is shown in operative position in the bowl 5. This strainer includes a rod 8, preferably of metal, stainless steel being a satisfactory substance. Substantially in the central portion thereof the rod is externally knurled or ribbed as indicated at 9, and this knurling increases the diameter of the rod in that region. By way of example, and not by way of limitation, an increase in diameter of 0.016 to 0.018 inch is satisfactory. Around the rod and over the major portion of the knurling 9 is a disc-like filter element or strainer 10. This element 10 is preferably made of powdered metal. The disc is apertured to fit over the rod 8 relatively freely, but the aperture is not large enough to permit the disc to slide over the knurled part 9. Pressure is utilized to secure the disc over the knurled part, and in the application of this pressure the central portion of the disc adjacent the rod is compressed as indicated at 11 in Figure 2 thus causing the material of the disc to enter between the ribs on the rod and secure the disc effectively to the rod. While the density of the filter element is somewhat increased adjacent the rod in the compressed portion 11, that portion is still capable of passing liquids. By way of example, and not by way of limitation, a compression of the disc up to a reduction in thickness of 20 to 25% of the original thickness is satisfactory.

It will be noted from the showing in Figure 1 that the rod 8 projects substantially equally on both sides of the disc. This rod provides sufficient weight to hold the disc down, that is, seated over the upper open end of the tube portion 7 of the coffee maker even though the liquid in the bottom bowl of the coffee maker be very vigorously boiled. The disc will not rise off its seat and consequently, coffee grounds cannot slide underneath the disc. The rod not only gives the necessary weight to hold the disc in position, but by virtue of its extending equally on both sides of the disc, the entire strainer may be utilized with either end uppermost and no particular attention need be given which end of the rod 8 enters the tube 7.

It will be noted that the strainer is a unitary item when completely formed, requires no additional parts nor any replacement of parts during its life. It is very economical and may be very simply cleansed merely by washing it the same as any other part of the apparatus would be washed. Further, the device is substantially unbreakable, requiring very severe treatment to fracture it.

In use, it simply is placed in the position shown in Figure 1 in lieu of any other strainer that may have been previously associated with the coffee maker.

In Figure 3, I have illustrated a step in the manufacture of the strainer. A lower die member 12 is provided with a bore 13 of such depth as to receive the rod 8, but only receive a small portion of the knurling 9. Around the bore on the die face is a relatively small annular pillow 14 into which the lower part of the knurling extends.

An upper die 15 is also used, and this die has a bore 16 therein with a similar annular pillow 17 on the face of the die around the bore. The bore 16 is of sufficient depth to permit the die pillows 14 and 17 to come together if nothing were placed between them; that is, the bore 16 will receive the entire other end of the rod and all of the exposed knurling.

In the manufacture of the strainer, the rod 8 is placed with one end in the bore 13 of the lower die 12. The disc-like filter element 10 is dropped over the rod, and rests upon the top portion of the knurling 9, as seen in Figure 3. The upper die is then placed over the upper portion of the rod 8 as also shown in this figure, and after that the two die portions may be brought toward each other. The movement of the upper die toward the lower die forces the disc 10 downwardly over the knurling, and the pillow formations 14 and 17 cause the above referred depression in the central portion of the disc around the rod to squeeze the material of the disc laterally between the ribs of the knurling. The disc is thus anchored firmly to the rod 8.

In Figure 4, I have illustrated a slightly different form of structure for the strainer, although this form is made by substantially the same method as the previously described form. In this instance, a rod 18 is utilized which is provided with spaced knurled portions 19 and 20 in the central region of the rod. Between these portions is a plain annular track 21 preferably just a part of the original rod exposed between the knurling rings 19 and 20. The same disc 10 is pressed upon the rod in the same manner as above described with the exception that in this instance the lower die will have a slightly deeper bore, namely, one that takes substantially all of the lower knurled patch 20. It will be understood that the plane portion 21 between the knurled rings may be of substantially the same width as the disc with the central portion slightly compressed, or it may be narrower than the compressed central portion of the disc as illustrated in Figure 4. When the die pressure is provided, the disc 10 is forced into position evenly around the plane portion 21 of the rod, and laterally compressed as indicated at 22 so that it is tightly associated with the rod between the knurled rings 19 and 20. Some portion of the disc will overlap the knurling on each side of the open part 21. This disc is even more firmly secured to the rod than the previously described embodiment of the invention. The entry of the disc into the open part 21 between the knurled rings effectively prevents removal of the disc by sliding it off either end of the rod, while the engagement of the disc and its lateral compression between the ribs of a part of each knurled ring 19 and 20 prevents any rotation of the disc relatively to the rod. Thus, with but a slight and in fact negligible additional operation of providing two knurled rings instead of only one, an even stronger strainer arrangement is provided.

From the foregoing, it is apparent that I have provided a novel strainer for coffee makers and the like, as well as a novel method of making a strainer. The strainer is extremely economical to manufacture, and the method is extremely economical to practice. The resulting strainer is not only non-fragile and non-frangible, but may be used with either end up, never requires any replacement of parts, and may be readily cleansed.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a strainer, a metallic rod externally knurled in the central region thereof, said knurled portion having a greater outside diameter than the remainder of said rod, and a liquid perforate but solid impervious filter disc pressed over the knurling on said rod and into the interstices of the knurling, said filter disc being slightly reduced in thickness and denser immediately adjacent said rod.

2. The method of making a strainer, including the steps of knurling a rod therearound in an intermediate location to provide a roughened bend of increased outside diameter, providing a filter disc with an aperture large enough to receive said rod but not said roughened band, and forcing said disc over said band while compressing the disc axially in the central portion to spread it laterally into the interstices of the roughened band.

3. The method of making a strainer, including the steps of knurling spaced bands around a rod, and forcing a liquid pervious disc over said knurled bands and simultaneously compressing said disc to force material thereof laterally into the space between said bands and into interstices of a part of the knurling of said bands.

MARTIN T. CAHENZLI, Jr.

REFERENCES CITED

The following references are of record in the file of this patent:

UNITED STATES PATENTS

| Number | Name | Date |
|---|---|---|
| 1,157,666 | Bennett | Oct. 26, 1915 |
| 1,346,058 | Robergel | July 6, 1920 |
| 1,397,848 | Wood et al. | Nov. 22, 1921 |
| 1,625,463 | Gauthier | Apr. 19, 1927 |
| 1,669,362 | Watson | May 8, 1928 |
| 1,927,287 | Kell et al. | Sept. 19, 1933 |
| 2,038,119 | Masin et al. | Apr. 21, 1936 |
| 2,114,748 | Prausnitz | Apr. 19, 1938 |
| 2,127,969 | Dingworth | Aug. 23, 1938 |
| 2,157,596 | Davis | May 9, 1939 |
| 2,164,158 | Masin | June 27, 1939 |
| 2,202,055 | Juffa | May 28, 1940 |
| 2,277,107 | Imes | Mar. 24, 1942 |
| 2,291,427 | Wolcott | July 28, 1942 |
| 2,331,705 | Lehmann | Oct. 12, 1943 |
| 2,345,262 | Jepson et al. | Mar. 28, 1944 |
| 2,392,358 | Blakeslee | Jan. 8, 1946 |
| 2,439,424 | Goodloe et al. | Apr. 13, 1948 |

FOREIGN PATENTS

| Number | Country | Date |
|---|---|---|
| 401,322 | Great Britain | Nov. 7, 1933 |